United States Patent [19]

Kishimoto

[11] Patent Number: 5,699,137
[45] Date of Patent: Dec. 16, 1997

[54] LIQUID CRYSTAL DISPLAY DEVICE HAVING COMPENSATOR WITH PARTICULAR RETARDATION IN THE INCLINED DIRECTION

[75] Inventor: Keiko Kishimoto, Osaka, Japan

[73] Assignee: Sharp Kabushiki Kaisha, Osaka, Japan

[21] Appl. No.: 695,985

[22] Filed: Aug. 15, 1996

[30] Foreign Application Priority Data

Oct. 6, 1995 [JP] Japan .................. 7-260473

[51] Int. Cl.$^6$ .................................. G02F 1/1335
[52] U.S. Cl. ................. 349/119; 349/99; 349/102; 349/118; 349/121
[58] Field of Search ................ 349/118, 119, 349/120, 121, 99, 102, 180

[56] References Cited

U.S. PATENT DOCUMENTS

| | | | |
|---|---|---|---|
| 5,142,393 | 8/1992 | Okumura et al. | 349/121 |
| 5,249,071 | 9/1993 | Yoshimizu et al. | 349/118 |
| 5,308,535 | 5/1994 | Scheuble et al. | 252/299.01 |
| 5,311,340 | 5/1994 | Murata et al. | 349/118 |
| 5,380,459 | 1/1995 | Kanemoto et al. | 349/118 |
| 5,506,706 | 4/1996 | Yamahara et al. | 349/118 |
| 5,518,783 | 5/1996 | Kawata et al. | 349/118 |
| 5,528,400 | 6/1996 | Arakawa | 349/118 |

FOREIGN PATENT DOCUMENTS

| | | |
|---|---|---|
| 2-73327 | 3/1990 | Japan . |
| 2-105111 | 4/1990 | Japan . |
| 2-256023 | 10/1990 | Japan . |
| 4-16916 | 1/1992 | Japan . |
| 6-148429 | 5/1994 | Japan . |

*Primary Examiner*—William L. Sikes
*Assistant Examiner*—Tai V. Duong
*Attorney, Agent, or Firm*—David G. Conlin; George W. Neuner

[57] ABSTRACT

It is an object of the invention to provide a liquid crystal display device capable of obtaining a wide viewing angle without coloration caused by a viewing angle. A liquid crystal display cell is disposed between a pair of polarizers, and between the liquid crystal display cell and the pair of polarizers, first optical compensation plates are disposed at the side of the liquid crystal display cell, and second optical compensation plates are disposed at the side of the polarizer. The first optical compensation plates have a refractive index anisotropy in the plane, and the refractive index thereof in the thickness direction is nearly equal to the refractive index of a minimum value in the plane, whereas the second optical compensation plates have no refractive index anisotropy in the plane, the refractive index in the thickness direction is greater than the refractive index in the plane, and a positive phase difference is expressed by inclination from the normal direction. By the optical compensation plates, the coloration of the display in the display plane of the liquid crystal display device and in the viewing angle direction inclined in a direction parallel to the display plane from the normal direction of the display plane can be compensated, so that a wide viewing angle of a high contrast is obtained.

7 Claims, 9 Drawing Sheets

RETARDATION VALUE Re WHEN SECOND OPTICAL COMPENSATION PLATE INCLINED 45 DEGREES FROM NORMAL DIRECTION (nm)

FIG.12 PRIOR ART

LIQUID CRYSTAL DISPLAY DEVICE HAVING COMPENSATOR WITH PARTICULAR RETARDATION IN THE INCLINED DIRECTION

BACKGROUND OF THE INVENTION

1. Field of the Invention

The present invention relates to a liquid crystal display device of STN (super twisted nematic) type having an excellent viewing angle characteristic preferably used as display means for OA (office automation) appliances such as word processors and personal computers.

2. Description of the Related Art

An STN type liquid crystal display device is constituted so that a liquid crystal display cell comprising liquid crystal molecules twisted and oriented by 180° to 270° between a pair of substrate members is disposed between a pair of polarizers. In the STN type liquid crystal display device thus constituted, a display assuming a yellow green or a yellow color by the birefringence of liquid crystal molecules is obtained. Such coloration of the display is not preferable, for instance, for realizing a monochromatic display or for realizing a multicolor display. Accordingly, to eliminate such coloration and obtain a bright and clear display, the color is compensated by using an optical compensation plate. The liquid crystal display device of excellent display quality capable of obtaining a bright and clear display is preferably used as display means for OA appliances such as word processors and personal computers.

As the STN type liquid crystal display device using the optical compensation plate, a so-called double-layered STN liquid crystal display device is known wherein two layers of liquid crystal display cell are laminated to each other. In the STN type liquid crystal display device, the coloration generated in the first layer of liquid crystal display cell used for display driving is compensated by the second layer of the liquid crystal display cell for optical compensation, thereby eliminating the coloration. The liquid crystal display device of such constitution has a problem in that the thickness of the display device is thicker and the weight of thereof is heavier than a single-layer type STN display device using only one layer of liquid crystal cell because the double-layered STN liquid crystal display device requires two layers of liquid crystal display cell.

Figure 12:
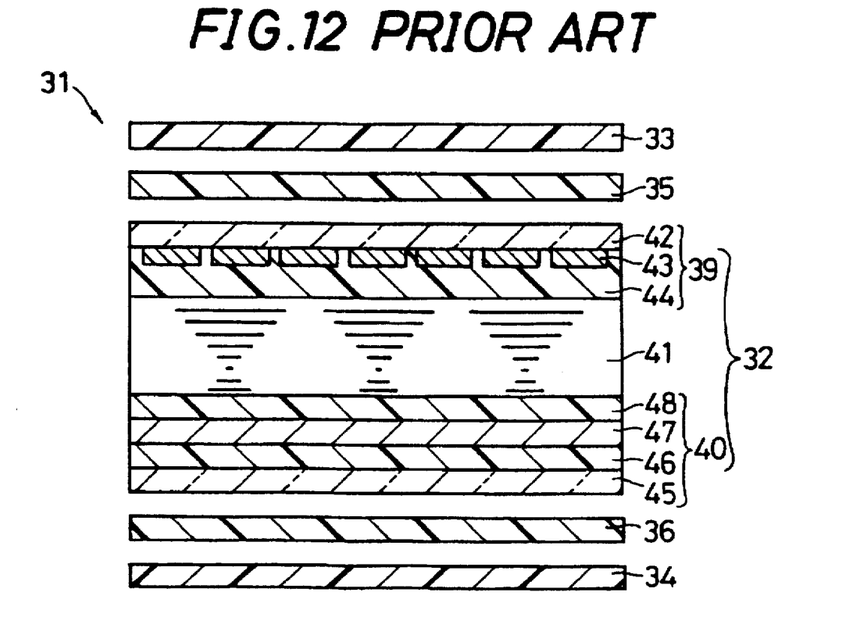
FIG. 12 is a sectional view showing a constitution of a liquid crystal display device 31 of prior art.

A thin and light-weight STN type liquid crystal display device is realized by using a phase difference plate made of a uniaxially drawn polymer film as the optical compensation plate. FIG. 12 is a sectional view showing a constitution of a liquid crystal display device 31 of the prior art using phase difference plates 35, 36. The liquid crystal display device 31 comprises a liquid crystal display cell 32, a pair of polarizers 33, 34, and phase difference plates 35, 36. The liquid crystal display cell 32 is disposed between the pair of polarizers 33, 34, and the phase difference plates 35, 35 are disposed between the polarizers 33, 34 and liquid crystal display cell 32. The liquid crystal display cell 32 is composed by interposing a liquid crystal layer 41 between a pair of substrate members 39, 40, and one substrate member 39 comprises a light permeable substrate 42, a transparent electrode 43, and an orientation film 44, and the other substrate member 40 comprises a light permeable substrate 45, a color filter 46, a transparent electrode 47, and an orientation film 48. The transparent electrodes 43, 47 are patterned and formed on the liquid crystal layer 41 side surface of the light permeable substrates 42, 45, and the orientation film 44, 48 are formed so as to cover the transparent electrodes 43, 47. Moreover, a color filter 46 is provided between the light permeable substrate 45 and transparent electrode 47 of the other substrate member 40.

As phase difference plates 35, 36, uniaxially drawn polymer films of polyvinyl alcohol, polycarbonate, polyarylate, polysulfone or the like may be used. In such phase difference plates 35, 38, the optical properties differ between a slow axis (drawing direction) and an orthogonal phase advancing axis direction of the film which runs at right angle with the slow axis, and the problem is that the viewing angle is narrower than the double-layered STN liquid crystal display device described above. By contrast, a phase difference plate made of polycarbonate improved in the viewing angle characteristic, for example, the NZR phase difference plate of Nitto Denko Co., Ltd. is realized by controlling the refractive index nz in the thickness direction to set the relation of two refractive indices nx, ny in the plane to nx>nz>ny in the case of the uniaxially drawn polymer film.

However, the phase difference plate having the above property of nx>nz>ny is not realized in various polymer films differing in the wavelength dispersion characteristics of the refractive index in the present technology. When the phase difference plate made of polyarylate or polysulfone is used in a narrow cell gap liquid crystal display cell which is intended to provide a higher speed response, the problem of a narrow range of the viewing angle cannot be solved.

Furthermore, for example, Japanese Unexamined Patent Publication JP-A 2-105111 and Japanese Unexamined Patent Publication JP-A 2-73327 disclose examples wherein an optical compensation plate having a refractive index anisotropy in the thickness direction is used. As a result, the rate of color change due to viewing angle decreases. Moreover, Japanese Unexamined Patent Publication JP-A 2-256023 and Japanese Unexamined Patent Publication JP-A 4-16916 disclose examples wherein an optical compensation plate having a refractive index anisotropy in a plane and an optical compensation plate having a refractive index anisotropy in the thickness direction are laminated to each other. Such two optical compensation plates are disposed between the polarizer and the liquid crystal display cell, and either of the two optical compensation plates may be disposed to the side of the liquid crystal display cell. Still more, Japanese Unexamined Patent Publication JP-A 6-148429 discloses a method of manufacturing a compound phase difference film wherein an optical compensation plate having a refractive index anisotropy in a plane and an optical compensation plate having a refractive index anisotropy in the thickness direction are laminated to each other. The phase difference plate fabricated by the manufacturing method disclosed in the publication can be used in the STN type liquid crystal display device, and the viewing angle characteristic is improved by using the method for manufacturing the STN type liquid crystal display.

The optical compensation plate such as the phase difference plate made of uniaxially drawn polymer film used for realizing the above thin and light-weight STN type liquid crystal display device differs in the refractive index between the polymer film drawing direction and an orthogonal direction which runs at a right angle with the polymer film drawing direction. That is, the optical compensation film possesses a birefringence. The retardation value Re=Δn·d given as the product of the difference Δn of refractive indices in two directions by a film thickness d is a physical quantity for giving the phase of light, but this retardation value Re assumes different values in the slow axis direction and phase advancing axis direction of the polymer film, depending on the viewing angle as mentioned above. For example, when the optical compensation film is made of polyvinyl alcohol, the retardation value in the slow axis direction tends to decrease while the retardation value in the phase advancing axis direction tends to increase as the aforementioned viewing angle increases, that is, according as the viewing direction is set at an angle more and more approximate to a direction parallel to the surface of the film. Accordingly, when the optical compensation plate is combined with the liquid crystal display device, the difference between the retardation value of the optical compensation plate and the retardation value of the liquid crystal display device increases with a wider viewing angle thereby breaking a color compensation relation despite the fact that the color compensation relation is perfect in the normal direction of the display surface. As a result, the optical compensation plate is colored with a wider viewing angle thereby changing the display contrast. That is, in such liquid crystal display device, the viewing angle for obtaining a favorable display quality is extremely narrow.

Incidentally, in the liquid crystal display device which is intended to provide a higher speed response, the cell gap tends to become narrower, and hence the wavelength dispersion of the refractive index of the liquid crystal display device increases with a narrower cell gap. In such liquid crystal display device, the phase difference plate made of polycarbonate having an optical property of nx>nz>ny as mentioned above provides neither a consistent wavelength dispersion nor a sufficient color compensation.

Moreover, in the liquid crystal display device disclosed in Japanese Unexamined Patent Publication JP-A 2-105111 and Japanese Unexamined Patent Publication JP-A 2-73327, only the optical compensation plate having a refractive index anisotropy in the thickness direction is used, the color in the plane cannot be compensated in principle. In the liquid crystal display device disclosed in Japanese Unexamined Patent Publication JP-A 2-256023 and Japanese Unexamined Patent Publication JP-A 4-16916, although the position of two optical compensation plates is not defined, the viewing angle characteristic actually varies significantly depending on the position of the two optical compensation plates. Thus the liquid crystal display devices mentioned in such publications do not always provide an excellent viewing angle characteristic. It is the same with Japanese Unexamined Patent JP-A 6-148429, and excellent viewing angle characteristic may not be always obtained in the laminating sequence of the compound phase difference films according to the manufacturing method disclosed in the above publication.

SUMMARY OF THE INVENTION

It is hence an object of the invention to provide a liquid crystal display device free from coloration resulting from a viewing angle, the device being capable of obtaining a wide viewing angle.

The invention provides a liquid crystal display device comprising:
- a pair of polarizers,
- a liquid crystal display cell disposed between the pair of polarizers, and interposing a liquid crystal layer of liquid crystal molecules twisted by 180° to 270° between a pair of substrate members,
- a first optical compensation plate disposed between at least one polarizer of the pair of polarizers and the liquid crystal display cell, the first optical compensation plate having a refractive index anisotropy in a plane, and having a refractive index in the thickness direction nearly equal to the refractive index of the minimum value within the plane, and
- a second optical compensation plate disposed between the first optical compensation plate and the one polarizer, the second optical compensation having no refractive index anisotropy in the plane, having a refractive index in the thickness direction greater than the refractive index in the plane, and exhibiting a positive phase difference depending on an inclination from the normal direction.

According to the invention, to widen a viewing field angle in the STN type liquid crystal display device using the optical compensation plate such as a phase difference plate or the like, the retardation values between the liquid crystal display cell and optical compensation plate may be consistent to each other despite a wider viewing angle which is an inclination angle to the normal direction of the display plane. As a consequence, the relation of color compensation is not broken at any viewing angle so that a wide viewing angle is obtained. Accordingly, in the invention, for example, the liquid crystal display device comprises a first optical compensation plate made of uniaxially drawn polymer films used hitherto, the plate having a refractive index anisotropy in a plane and having a refractive index in the thickness direction nearly equal to the refractive index of minimum value in the plane, and a second optical compensation plate formed on a polymer film free from the optical anisotropy in the surface, the plate having no refractive index anisotropy in the plane and having a refractive index in the thickness direction greater than the refractive index in the plane and exhibiting a positive phase difference depending on an inclination from the normal line direction. In the invention, these optical compensation plates are disposed between at least either of the pair of polarizers and the liquid crystal display element. The first optical compensation plate is disposed at the side of the liquid crystal display cell, and the coloration in the plane is compensated by this compensation plate. The second optical compensation plate is disposed at the polarizer side so that the second optical compensation plate compensates for the coloration in the thickness direction, that is, when the viewing angle is inclined. Therefore, at any viewing angle, the relation of color compensation can be maintained.

In the invention, it is preferable in that the retardation value of the second optical compensation plate in the direction inclined by 45° from the normal direction to the second optical compensation plate is selected to be in a range of 40 nm to 75 nm.

According to the invention, a wide viewing angle of excellent display quality may be obtained by selecting the second optical compensation plate from the materials having the aforementioned characteristic.

In the invention, it is further preferable in that the second optical compensation plate is made of a polymer liquid crystal film immobilized in the vertical orientation.

According to the invention, the second optical compensation plate is realized by the polymer liquid crystal film immobilized in the vertical orientation. Hence, a wide viewing angle of excellent display quality is obtained.

In the invention, it is still further characterized in that the first optical compensation plate is made of a uniaxially drawn polymer film.

According to the invention, the first optical compensation plate is realized by adopting the uniaxially drawn polymer film. Hence, a wide viewing angle of excellent display quality is obtained.

In the invention, it is still further preferable in that the first optical compensation plate is made of a twisted and oriented polymer liquid crystal.

According to the invention, the first optical compensation plate is made of the twisted and polymer liquid crystal. Hence, a wide viewing angle of excellent display quality can be obtained.

In the invention, it is still further preferable in that the first and second optical compensation plates are disposed respectively between the polarizers and liquid crystal display cell, an angle θ1 formed by a slow axis of one of the first optical compensation plate and an orientation axis of the liquid crystal molecule at the side of the same compensation plate is selected to be in a range of 95° to 105°, an angle θ2 formed by a slow axis of the other first optical compensation plate and the orientation axis of the liquid crystal molecule at the side of the same compensation plate is selected to be in a range of 75° to 85°, an angle α formed by an absorption axis of the polarizer at the side of the other first optical compensation plate and the orientation axis of liquid crystal molecule at the side of the same polarizer is selected to be in a range of 45° to 55°, and an angle β formed by an absorption axis of the polarizer at the side of the first optical compensation plate and the orientation axis of liquid crystal molecule at the side of the same polarizer is selected to be in a range of 35° to 45°.

In the invention, it is still further preferable in that the first and second optical compensation plates are disposed between the polarizers and liquid crystal display cell, the angle θ1 formed by the slow axis of one of the first optical compensation plate and the orientation axis of the liquid crystal molecule at the side of the same compensation plate is selected to be in the range of 95° to 105°, the angle θ2 formed by the slow axis of the other first optical compensation plate and the orientation axis of the liquid crystal molecule at the side of the same compensation plate is selected to be in the range of 35° to 45°, the angle α formed by the absorption axis of the polarizer at the side of the other first optical compensation plate and the orientation axis of the liquid crystal molecule at the side of the same polarizer is selected to be in the range of 45° to 55°, and the angle β formed by the absorption axis of the polarizer at the side of the former first optical compensation plate and the orientation axis of liquid crystal molecule at the side of the same polarizer is selected to be in the range of 45° to 55°.

In the invention, it is still further preferable in that the first and second optical compensation plates are disposed between one of the pair of polarizers and liquid crystal display cell, an angle θ3 formed by the slow axis of the first optical compensation plate and the orientation axis of liquid crystal molecule at the side of the same compensation plate is selected to be in a range of 85° to 95°, an angle α formed by an absorption axis of a polarizer at the side where the optical compensation plate is not disposed and the orientation axis of liquid crystal molecule at the side of the same polarizer is selected to be in a range of 55° to 65°, and an angle β formed by an absorption axis of the polarizer at the side of the first optical compensation plate and an orientation axis of the liquid crystal molecule at the side of the same polarizer side is selected to be in a range of 25° to 35°.

According to the invention, it was confirmed that a wide viewing angle with an excellent display quality can be obtained by disposing the members in the above configuration.

According to the invention, a change in the retardation value relative to the viewing angle can be decreased, and hence a coloration at various viewing angles can be sufficiently compensated, and a high contrast is obtained, and also a wide viewing angle without the coloration is achieved by disposing the first optical compensation plate having a refractive index anisotropy within a surface, and the second optical compensation plate exhibiting a positive phase difference when the second compensation plate is inclined from the normal direction. Besides, a wide viewing field angle with a high contrast can be obtained, and a liquid crystal display device having a high speed response can be realized by using a uniaxially drawn polymer film having a high wavelength dispersion suited to liquid crystal display cell which is intended to provide a high speed response.

A wide viewing angle of a high contrast can be obtained by selecting the retardation value Re of the second optical compensation plate in the range of 40 nm to 75 nm when the second optical compensation plate is inclined by 45° from the normal direction of the second optical compensation plate. In particular, the effect is outstanding in the diagonal direction of the display screen extremely lowered in contrast along with the emergence of a larger screen.

In addition, the second optical compensation plate may be also realized by the adoption of a high polymer liquid crystal film immobilized in the vertical orientation. The first optical compensation plate is realized by the adoption of the uniaxially drawn polymer film or twisted and oriented liquid crystal high polymer.

BRIEF DESCRIPTION OF THE DRAWINGS

Other and further objects, features, and advantages of the invention will be more explicit from the following detailed description taken with reference to the drawings wherein:

FIG. 2 is a diagram showing a configuration of the liquid crystal display device 1a;

DETAILED DESCRIPTION OF THE PREFERRED EMBODIMENTS

Now referring to the drawings, preferred embodiments of the invention are described below.

Figure 1:
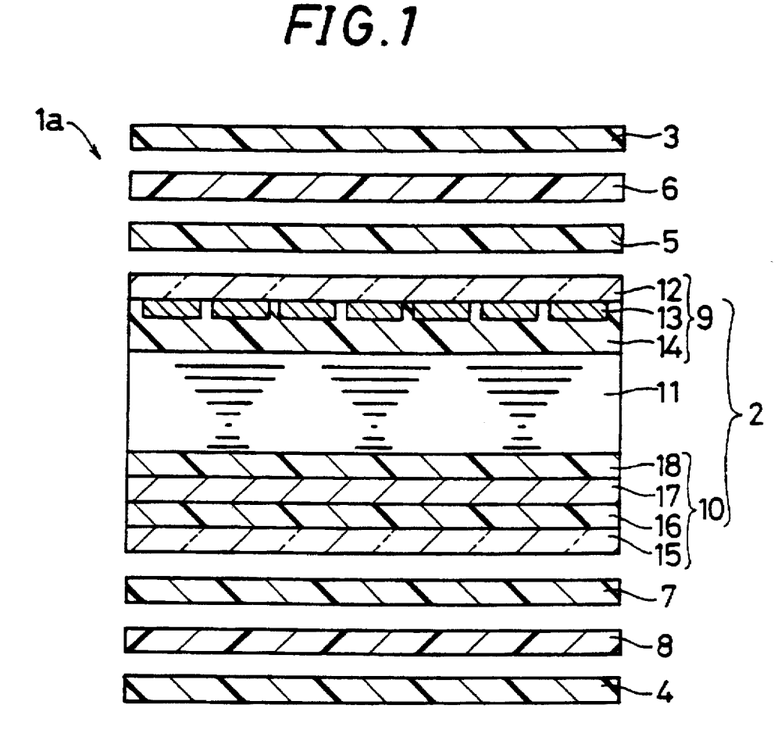
FIG. 1 is a sectional view showing a constitution of a liquid crystal display device 1a according to one embodiment of the invention.

FIG. 1 is a sectional view showing a constitution of a liquid crystal display device 1a according to an embodiment of the invention. The liquid crystal display device 1a comprises a liquid crystal display cell 2, a pair of polarizers 3 and 4, first optical compensation plates 5 and 7, and second optical compensation plates 6 and 8. Between the pair of polarizers 3 and 4, the liquid crystal display cell 2 is disposed, and between the liquid crystal display cell 2 and the polarizers 3 and 4, respectively, the first optical compensation plates 5 and 7 and second optical compensation plates 6 and 8 are disposed. The first optical compensation plates 5 and 7 are disposed at the side of the liquid crystal display cell 2, and the second optical compensation plates 6 and 8 are disposed at the side of the polarizers 3 and 4. The liquid crystal display cell 2 is composed by interposing a liquid crystal layer 11 between a pair of substrate members 9 and 10. The substrate member 9 comprises a light permeable substrate 12, a transparent electrode 13, and an orientation film 14, and the substrate member 10 comprises a light permeable substrate 15, a color filter 16, a transparent electrode 17, and an orientation film 18.

The transparent electrode 13 made of, for example, ITO (indium tin oxide) is formed on the surface of the light permeable substrate 12 made of, for example, glass at the side of the liquid crystal layer 11. The liquid crystal display device 1a may be of, for example, a segment type, a simple matrix type, or an active matrix type, and the transparent electrode 13 is patterned and formed according to the selected type. The color filter 16 is formed on surface of the light permeable substrate 15 at the side of the liquid crystal layer 11 the substrate 15 being realized by using glass or the like in the same manner as the light permeable substrate 12 at the side of the liquid crystal layer 11. Furthermore, the transparent electrode 17 is patterned and formed in the same manner as the transparent electrode 13. Orientation films 14 and 18 made of polyimide or the like are formed virtually on the entire surface of the light permeable substrates 12 and 15 on which the transparent electrodes 13 and 17 are formed. After resin films made of polyimide or the like are formed, the orientation films 14 and 18 are formed by subjecting the resin film surfaces to an orientation treatment such as a rubbing treatment or the like. In this way, the substrate members 9 and 10 are completed.

As the liquid crystal material for forming the liquid crystal layer 11, for example, a nematic liquid crystal possessing a positive dielectric constant anisotropy is used. A liquid crystal mixture doped with a cholesteric nonanate (CN) as a chiral dopant (chiral substance) for defining the twist direction of liquid crystal molecules is used in a phenyl cyclohexane (PCH) type liquid crystal. The substrate members 9 and 10 are arranged so that the transparent electrodes 13 and 17 may run at right angle to each other when the transparent electrodes 13 and 17 are formed, for example, in mutually parallel band forms. Thus a display can be given by using the overlapping portions of the transparent electrodes 13 and 17 as pixels. The orientation treatment direction of the orientation films 14 and 18 is selected in an array direction so that the liquid crystal molecule of the liquid crystal layer 11 interposed between the substrate members 9, 10 may be constituted in an STN type twisted structure such that the orientation films are twisted and oriented by 180° to 270° between the substrate members 9 and 10.

As the pair of polarizers 3 and 4, for example, polarizers of neutral gray type with a single transmissivity of 42% and a polarization degree of 99.9% are used. The first optical compensation plates 5 and 7 are realized, for example, by the adoption of uniaxially drawn polymer films or twisted polymer liquid crystals having a refractive index anisotropy in the plane and a refractive index in the thickness direction which the index is nearly equal to a refractive index of a minimum value in the plane. The second optical compensation plates 6 and 8 are realized, for example, by the adoption of polymer liquid crystal films immobilized in the vertical orientation formed on a polymer film having no optical anisotropy, and no refractive index anisotropy in the plane, having a refractive index in the thickness direction greater than the refractive index in the plane, and exhibiting a positive phase difference by the inclination of the second optical compensation film from the normal direction. As such first and second optical compensation plates 5 to 8, for example, materials disclosed in Japanese Unexamined Patent Publication JP-A 6-148429 may be used, and they may be fabricated in the manufacturing method disclosed in the same publication.

Figure 2:
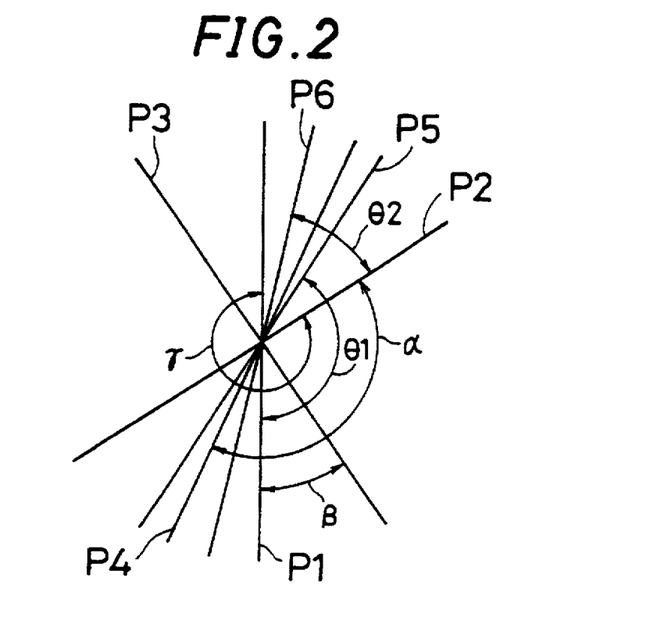

FIG. 2 is a diagram showing a configuration of the liquid crystal display device 1a. An orientation axis (an orientation treatment direction of the orientation film 14) of the liquid crystal molecule at the side of the orientation film 14 is denoted by a symbol P1, an orientation axis (an orientation treatment direction of the orientation film 18) of the liquid crystal molecule at the side of the orientation film 18 is denoted by symbol P2, an absorption axis of the polarizer 3 at the side of the orientation film 14 side is denoted by a symbol P3, an absorption axis of the polarizer 4 at the side of the orientation film 18 is designated by a symbol P4, a slow axis of the first optical compensation plate 5 at the side of the orientation film 14 is denoted by a symbol P5, and the slow axis of the first optical compensation plate 7 at the side of the orientation film 18 is denoted by a symbol P6. An angle formed by the orientation axis P1 and slow axis P5 is denoted by a symbol $\theta_1$, an angle formed by the orientation axis P2 and slow axis P6 is denoted by a symbol $\theta_2$, an angle formed by the orientation axis P2 and the absorption axis P4 is denoted by a symbol $\alpha$, an angle formed by the orientation axis P1 and the absorption axis P3 is denoted by a symbol $\beta$, and an angle formed by the orientation axis P1 and orientation axis P2, that is, an twist angle formed by the liquid crystal molecules between the substrate members 9 and 10 is denoted by a symbol $\gamma$. The twist angle $\gamma$ is selected to be in a range of 180° to 270°.

Generally, the uniaxially drawn polymer film can be used as the optical compensation plate such as the phase difference plate because the uniaxially drawn polymer film has an optical anisotropy. That is, a refractive index nx in the slow axis direction and a refractive index ny in the phase advancing axis direction are different. Color compensation by optical compensation plates in the prior art was conducted only in the normal direction of the display surface of the liquid crystal display device. This color compensation by optical compensation plate is achieved by eliminating the relative phase difference of the light (ordinary ray and extraordinary ray) passing through the liquid crystal display cell by the retardation value Re=$\Delta$n·d which is the product of the refractive index anisotropy $\Delta$n of the optical compensation plate by a film thickness d, or by adjusting all the wavelengths of light passing through the liquid crystal display cell in same phase. Such color compensation is done only in the normal direction, and as the viewing angle is inclined from the normal direction, the display is colored.

In this embodiment, the first and second optical compensation plates 5 to 8 are disposed in order to sufficiently compensate for colors within the display surface of the liquid crystal display device and in a direction inclined in a direction parallel to the display surface from the normal direction of the display surface.

The refractive index anisotropies $\Delta nx$, $\Delta ny$ as seen from the slow axis direction and phase advancing axis direction, and the retardation value Re are defined as follows, supposing that the angle formed by the normal direction of the optical compensation plate and the direction inclined in a direction parallel to the surface of the optical compensation plate from the normal direction is denoted by $\psi$. The refractive index anisotropy $\Delta nx$ seen from the slow axis direction is expressed as $\Delta nx=\{nx^2nz^2/(nx^2\sin^2\psi+nz^2\cos^2\psi)\}^{1/2}-ny$, and the refractive index anlsotropy $\Delta ny$ seen from the phase advancing axis direction is expressed as $\Delta ny=nx-\{ny^2nz^2/(ny^2\sin^2\psi+nz^2\cos^2\psi)\}^{1/2}$. The retardation value Re is expressed as $Re=\Delta nx\cdot d/\cos\psi$, where d is the thickness of the optical compensation plate.

First Embodiment

The first optical compensation plates 5 and 7 made of uniaxially drawn polyarylate and having a retardation value Re of 445 nm were used. The second optical compensation plates 6 and 8 were made of a polymer liquid crystal film immobilized in the vertical orientation which film is formed on a TAC (triacetyl cellulose) film. The retardation value of the second optical compensation films 6 and 8 was 60 nm when the second optical compensation was inclined by 45° from the normal direction. The product $d\cdot\Delta n$ of a thickness d of the liquid crystal layer 11 of the liquid crystal display cell 2 by a refractive index anisotropy $\Delta n$ was set to 0.82 μm. The angles $\theta 1$, $\theta 2$, $\alpha$, $\beta$, $\gamma$ were respectively set at 100°, 80°, 50°, 40° and 260°.

Figure 3:
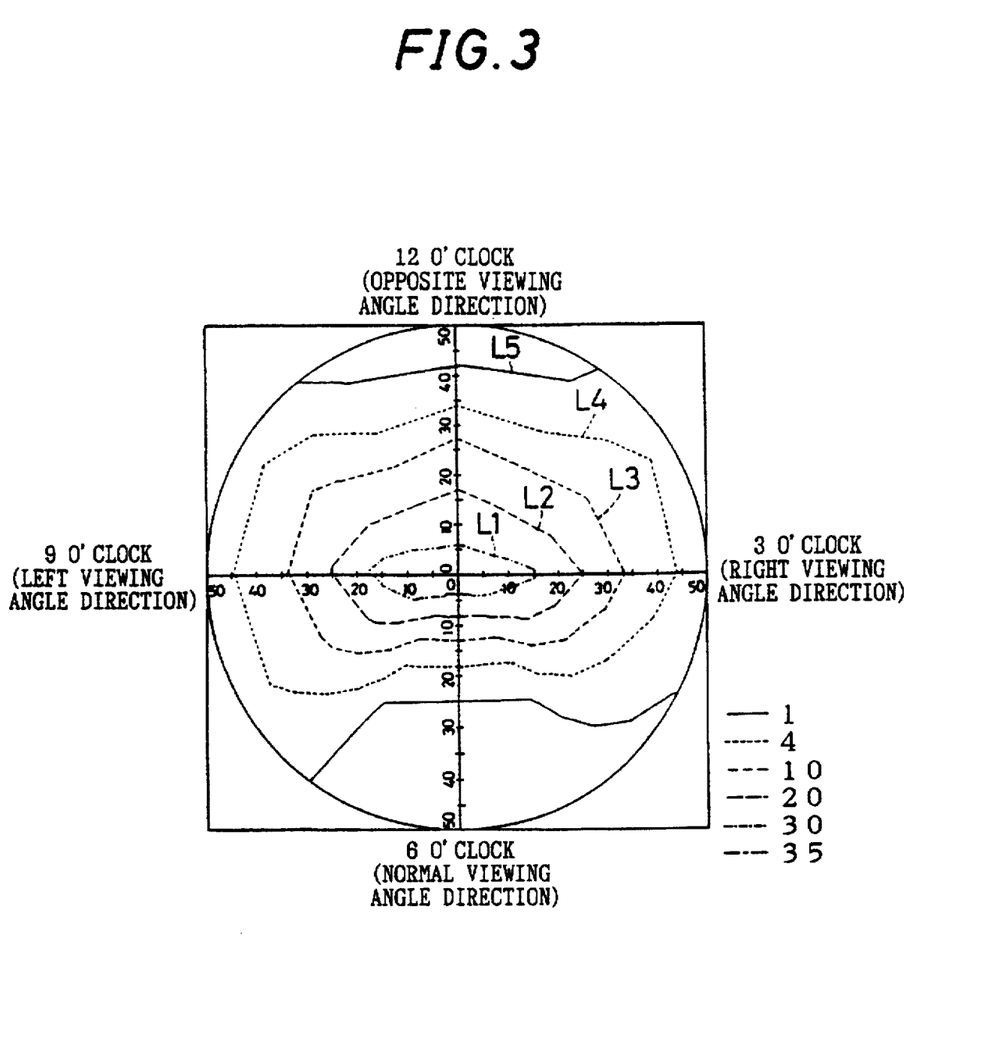
FIG. 3 is a diagram showing a viewing angle characteristic of the liquid crystal display device 1a according to a first embodiment.
Figure 4:
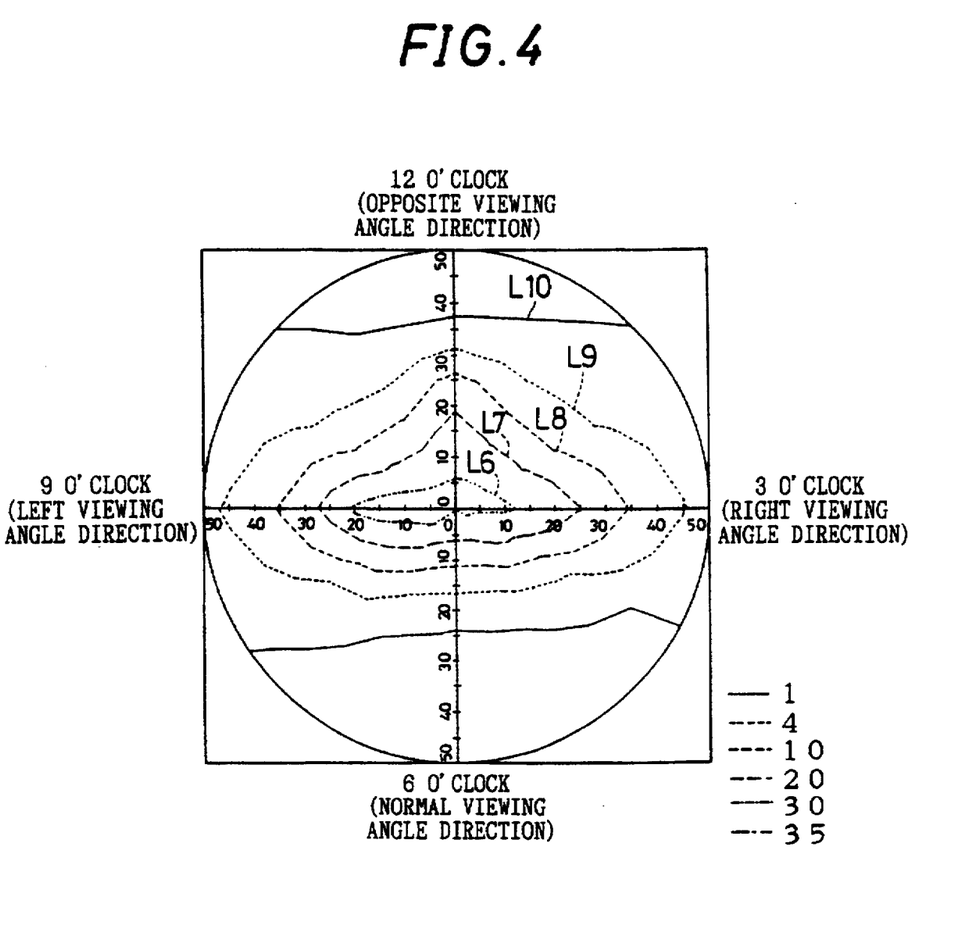
FIG. 4 is a diagram showing a viewing angle characteristic of the liquid crystal display device of the prior art.

FIG. 3 is a diagram showing a viewing angle characteristic of the liquid crystal display device 1a according to a first embodiment. FIG. 4 is a diagram showing a viewing angle characteristic of the liquid crystal display device 31 of the prior art shown in FIG. 12. The phase difference plates 35 and 36 of the liquid crystal display device 31 of the prior art are same as the first optical compensation plates 5 and 7 of the liquid crystal display device 1a of the first embodiment. Curves L1 and L6 link points of a contrast ratio of 30; curves L2 and L7 link points of a contrast ratio of 20; curves L3 and L8 link points of the contrast ratio of 10; curves L4 and L9 link points of a contrast ratio of 4; and curves L5 and L10 link points of a contrast ratio of 1, respectively. It has been made clear that points of a high contrast are distributed widely in the normal viewing angle direction, the opposite viewing angle direction, and right and left viewing angle directions in the embodiment of the liquid crystal display device 1a as compared with the liquid crystal display device 31 of the prior art. It has been also made clear that the points are also distributed widely in the diagonal directions.

Second Embodiment

The first optical compensation plates 5 and 7 made of uniaxially drawn polycarbonate and having a retardation value Re of 428 nm was used in the second embodiment. Furthermore, the second optical compensation plates 6 and 8 used in the second embodiment had the same structure as the first embodiment. The second compensation plate had a retardation value of 70 nm when the second optical compensation plates 6 and 8 were inclined by 45° from the normal direction. The product $d!\&\Delta n$ of the thickness d of the liquid crystal layer 11 of the liquid crystal display cell 2 and the refractive index anisotropy $\Delta n$ was 0.84 μm. The angles $\theta 1$, $\theta 2$, $\alpha$, $\beta$, $\gamma$ were respectively set at 100°, 40°, 50°, 50°, and 240°.

Figure 5:
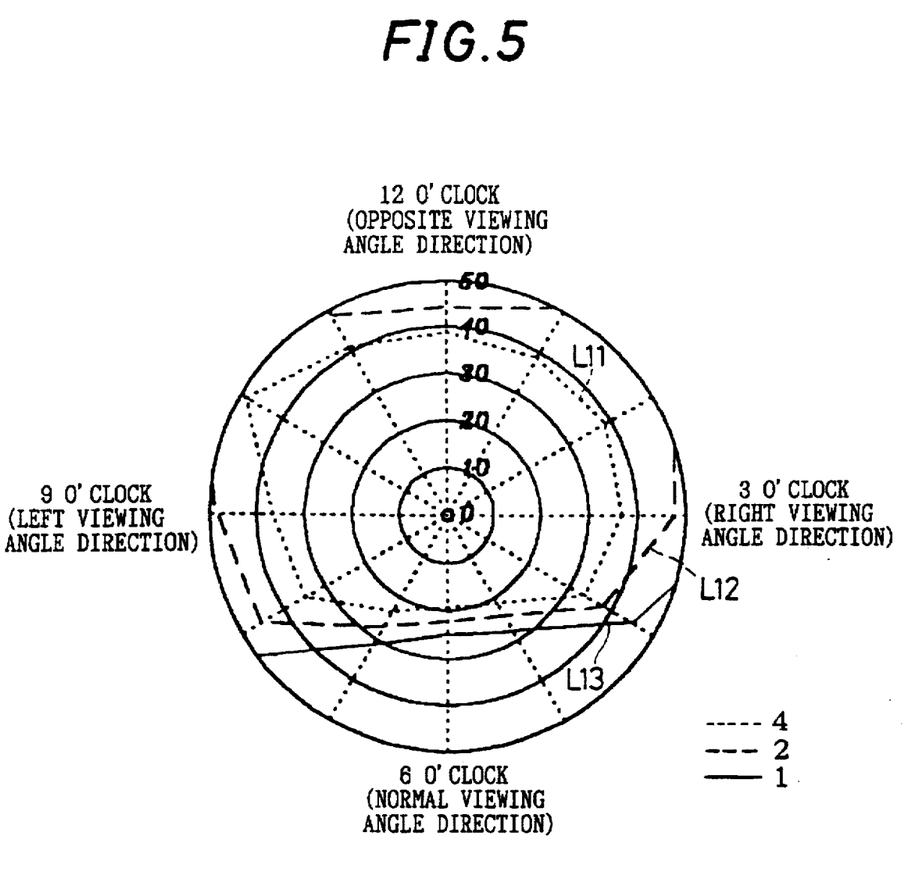
FIG. 5 is a diagram showing a viewing angle characteristic of the liquid crystal display device 1a according to a second embodiment.
Figure 6:
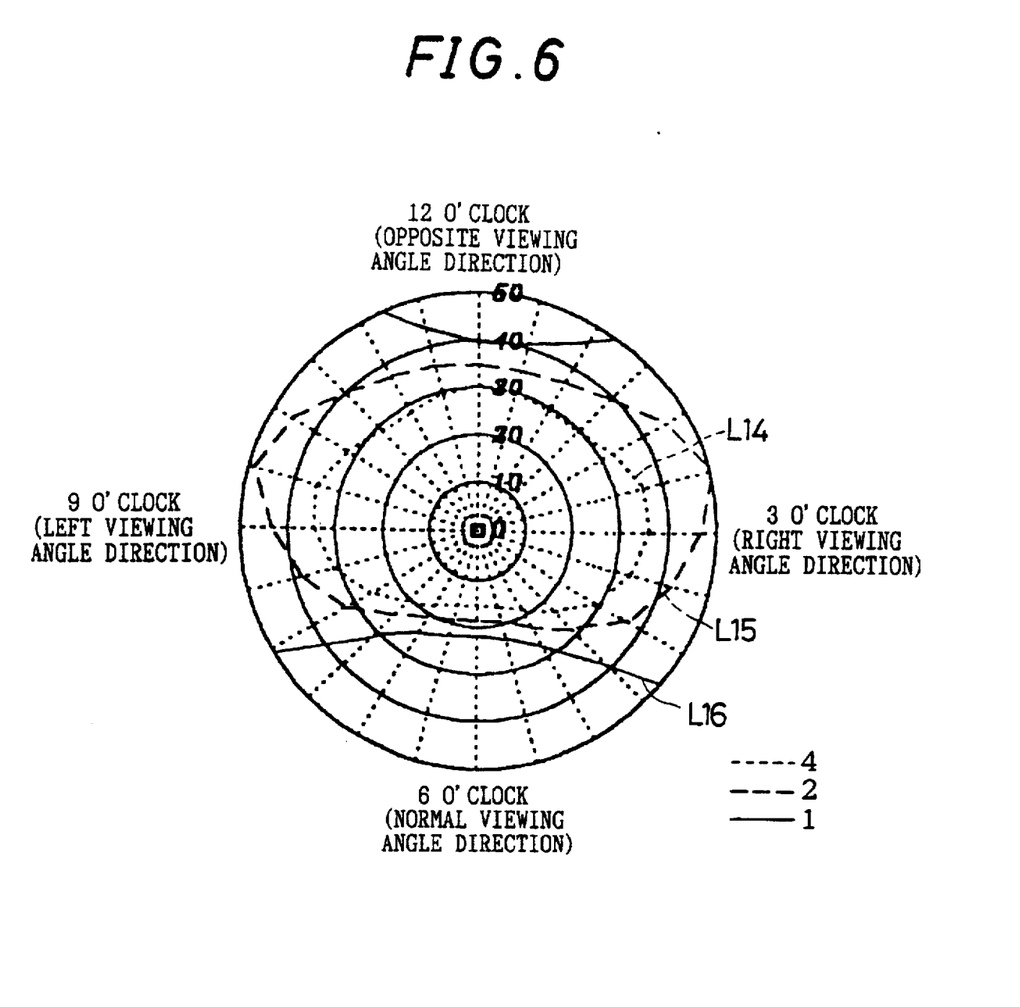
FIG. 6 is a diagram showing a viewing angle characteristic of the liquid crystal display device of prior art.

FIG. 5 is a diagram showing a viewing angle characteristic of the liquid crystal display device 1a according to a second embodiment. FIG. 6 is a diagram showing a viewing angle characteristic of the liquid crystal display device 31 of the prior art shown in FIG. 12. The phase difference plates 35 and 36 of the liquid crystal display device 31 of the prior art are the same as the first optical compensation plates 5, 7 of the liquid crystal display device 1a of the second embodiment. Curves L11 and L14 link points of the contrast ratio of 4; curves L12 and L15, points of a contrast ratio of 2; and curves L13 and L16 link points of the contrast ratio of 1, respectively. It has been made clear with respect to the viewing angle characteristic that points of a high contrast are distributed widely in the normal viewing angle direction, the opposite viewing angle direction, and right and left viewing angle directions in the second embodiment of the liquid crystal display device 1a as compared with the liquid crystal display device 31 of the prior art. It has been also made clear that the points are also distributed widely in the diagonal directions.

Figure 7:
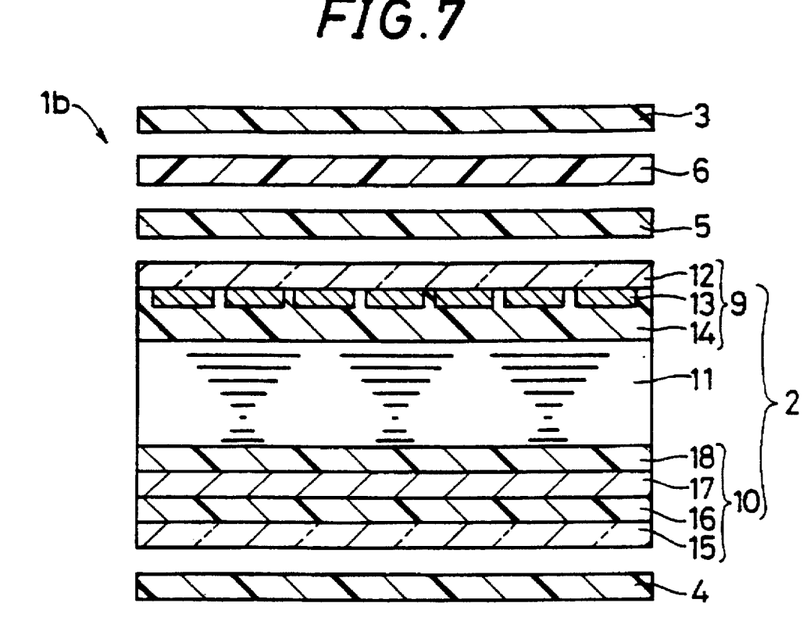
FIG. 7 is a sectional view showing a constitution of a liquid crystal display device 1b in a different form according to the second embodiment of the invention.

FIG. 7 is a sectional view showing a constitution of a liquid crystal display device 1b having a different form of the invention. The liquid crystal display device 1b is constituted in the same manner as the liquid crystal display device 1a, except that the liquid crystal display device 1b does not have first and second optical compensation plates 7 and 8 disposed at the side of the polarizer 4 of the liquid crystal display device 1a. In FIG. 7, the members which are constituted in the same manner as the liquid crystal display device 1a are denoted by the same reference numerals, and explanations thereof are omitted.

Figure 8:
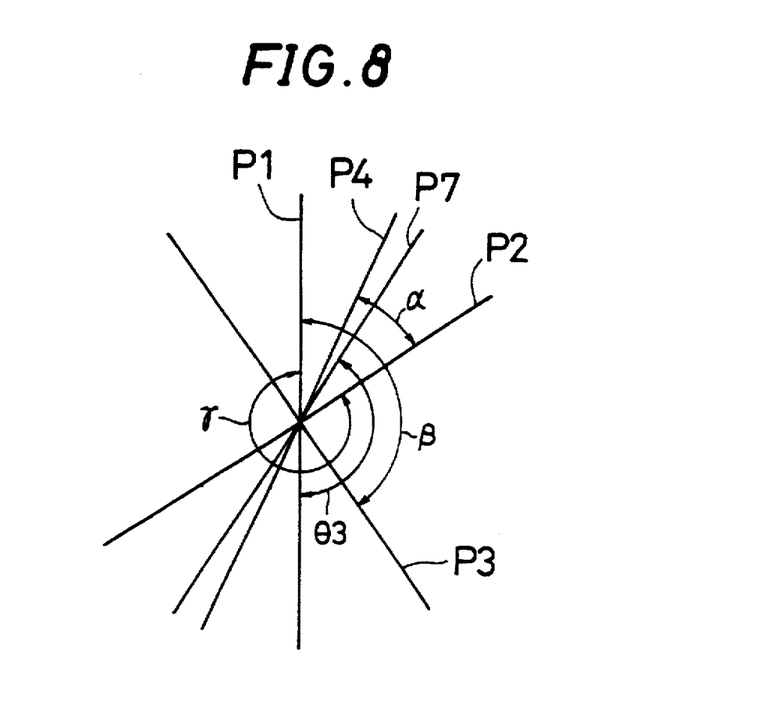
FIG. 8 is a diagram showing a configuration of the liquid crystal display device 1b.

FIG. 8 is a diagram showing a configuration of the liquid crystal display device 1b. An orientation axis (an orientation treatment direction of the orientation film 14) of the liquid crystal molecule at the side of the orientation film 14, that is, at the side of the optical compensation plates 5 and 6 is denoted by a symbol P1, an orientation axis (an orientation treatment direction of the orientation film 18) of the liquid crystal molecule at the side of the orientation film 18, that is at the side where the optical compensation plates are not disposed is denoted by a symbol P2, the absorption axis of the polarizer 3 at the side of the orientation film 14 is denoted by a symbol P3, an absorption axis of the polarizer 4 at the side of the orientation film 18 is denoted by a symbol P4, and the slow axis of the first optical compensation plate 5 is denoted by a symbol P7. An angle formed by the orientation axis P1 and the slow axis P7 is denoted by a symbol $\theta 3$, an angle formed by the orientation axis P2 and the absorption axis P4 is denoted by a symbol $\alpha$, an angle formed by the orientation axis P1 and absorption axis P3 is denoted by a symbol $\beta$, and an angle (twist angle) formed by the orientation axis P1 and the orientation axis P2 is denoted by a symbol $\gamma$. The twist angle $\gamma$ is selected to be in the range of 180° to 270°, also in this embodiment.

Third Embodiment

The first optical compensation plate 5 used in the third embodiment has a structure such that the liquid crystal molecule is twisted by 240° between one and the other surfaces of the optical compensation plate 5 and the plate is made of a polymer liquid crystal film with a retardation value Re of 550 nm. The second optical compensation plates 6 used in the third embodiment has the same structure as the counterpart of the first embodiment, and the second compensation plate 6 of the third embodiment has a retardation value of 75 nm when the second optical compensation plate 6 is inclined by 45° from the normal direction. The product $d\cdot\Delta n$ of a thickness d of the liquid crystal layer 11 of the liquid crystal display cell 2 by a refractive index anisotropy Δn was set to 0.81 μm. The angles θ3, α, β, γ were respectively set at 90°, 60°, 30°, and 240°.

Figure 9:
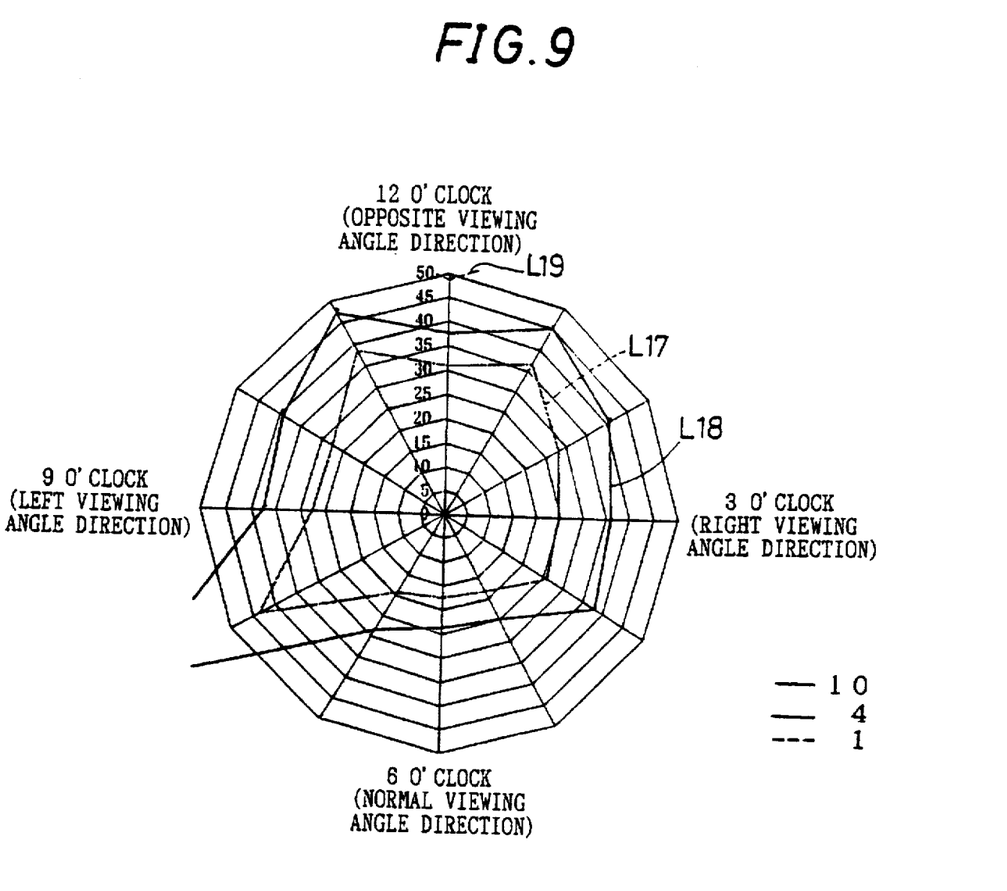
FIG. 9 is a diagram showing a viewing angle characteristic of the liquid crystal display device 1b according to a third embodiment.
Figure 10:
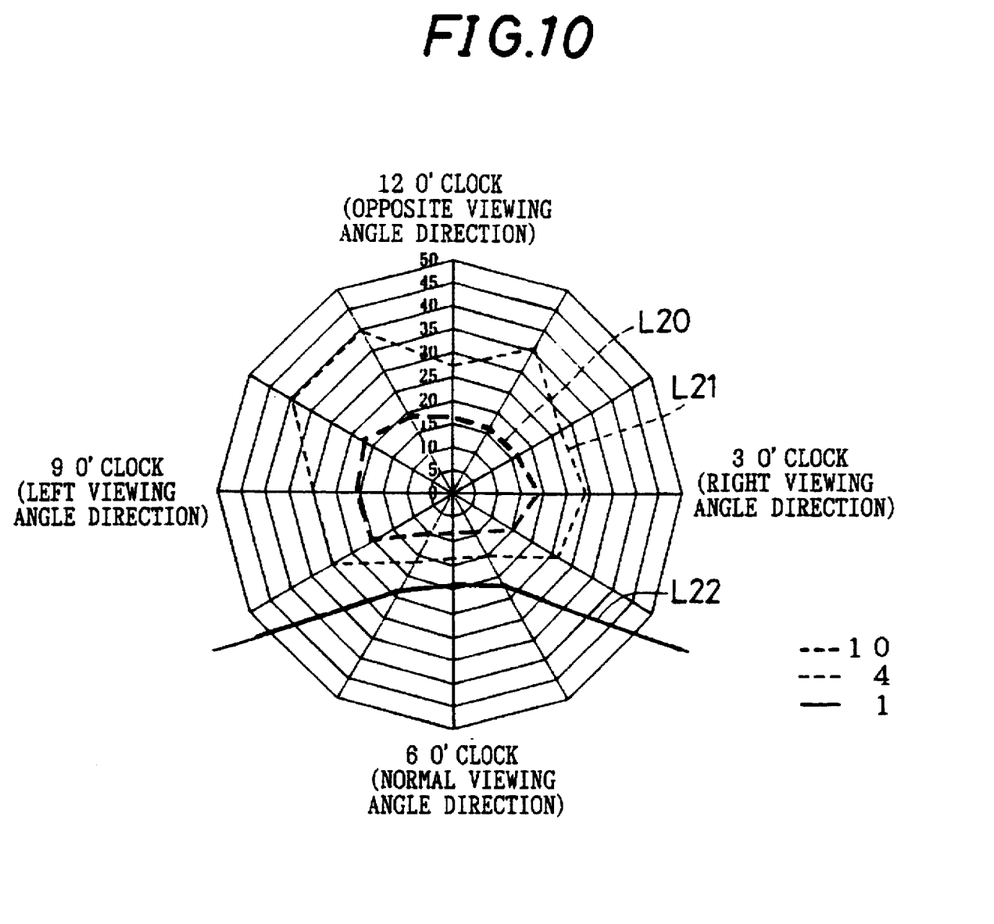
FIG. 10 is a diagram showing a viewing angle characteristic of the liquid crystal display device of prior art.

FIG. 9 is a diagram showing a viewing angle characteristic of the liquid crystal display device 1b according to a third embodiment. FIG. 10 is a diagram showing a viewing angle characteristic of the liquid crystal display device of the prior art. The liquid crystal display device of the prior art having the viewing angle characteristic as shown in FIG. 10 refers to a liquid crystal display device 31 shown in FIG. 12 wherein only one of the phase difference plates 35 and 36 is disposed, the phase difference plate being the same as the first optical compensation plate 5 in the liquid crystal display device 1b according to the third embodiment. Curves L17 and L20 link points of the contrast ratio of 10; curves L18 and L21 link points of the contrast ratio of 4; and curves L19 and L22 link points of the contrast ratio of 1, respectively.

It has been made clear that a region providing a high contrast is distributed widely in the normal viewing angle direction, the opposite viewing angle direction, and the right and left viewing angle directions in the third embodiment of the liquid crystal display device 1b as compared with the liquid crystal display device of the prior art. It has been made clear that almost no region is formed where a reversal phenomenon of the monochromatic display can be seen such that a white display is inverted to a black display while a black display is inverted into a white display even when the optical compensation plate is inclined by about 50° with respect to the normal direction of the display surface which direction includes a central point.

Figure 11:
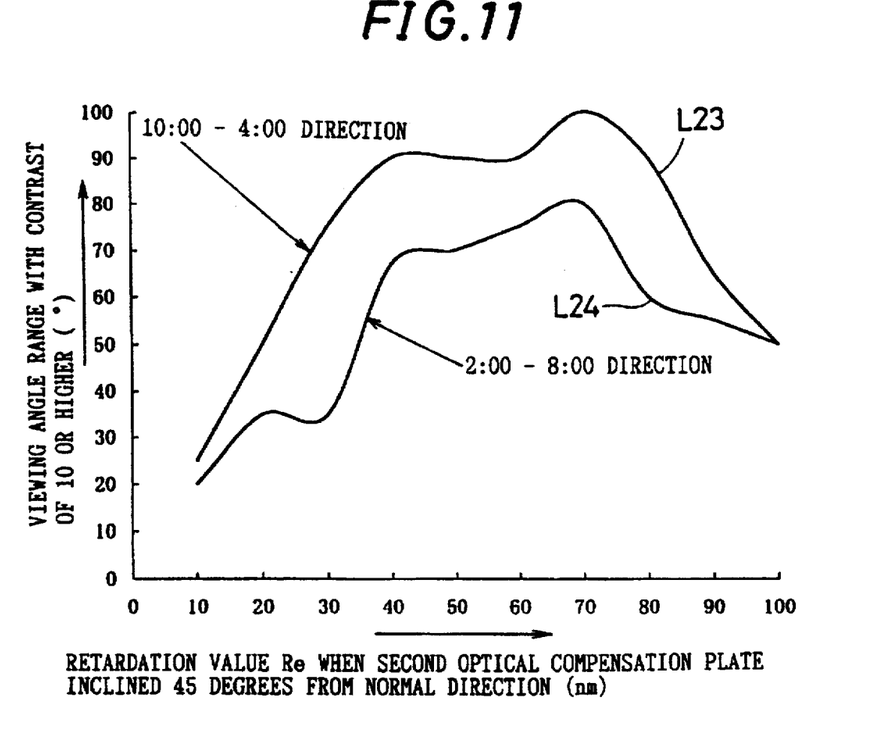
FIG. 11 is a graph showing a relation between a retardation value Re of the second optical compensation plate and a viewing angle with a contrast ratio of 10 or more when the second optical compensation plate is inclined by 45° from the normal direction of second optical compensation plates 6, 8.

FIG. 11 is a graph showing a relation of the retardation value Re given when the second optical compensation plates 6 and 8 are inclined by 45° from the normal direction of thereof and a viewing angle range of the contrast ratio of 10 or more, that is, an angle ψ given when the contrast ratio of 10 is not obtained as the viewing angle is inclined from the normal direction. Curve L23 shows the relation in the 10 o'clock to 4 o'clock direction of the liquid crystal display device, and curve L24 shows the relation in the 2 o'clock to 8 o'clock direction thereof. It has been made clear that the region of the contrast ratio of 10 or more in the 2 o'clock to 8 o'clock direction indicated by the curve L24 is extremely narrowed when the retardation value Re becomes smaller than 40 nm. It has been made clear that the region of the contrast ratio of 10 or more in the 10 o'clock to 4 o'clock direction indicated by curve L23 is extremely narrowed when the retardation value Re exceeds 75 nm. Therefore, preferably, the retardation value Re given when the second optical compensation plates 6 and 8 are inclined by 45° from the normal direction thereof is selected to be in the range of 40 nm to 75 nm. Hence, a wide viewing angle of a high contrast is obtained.

In the foregoing description, an explanation is made only with respect to embodiments of the liquid crystal display device wherein the first optical compensation plates 5 and 7 made of uniaxially drawn films were used and the second optical compensation plates 6 and 8 made of polymer liquid crystal films formed on a polymer film (TAC) having no optical anisotropy were used, the polymer crystal film being immobilized in the vertical orientation. However, the polymer crystal films 6 and 8 immobilized in the vertical orientation which were used as the second optical compensation films may be formed directly on the uniaxially drawn polymer films which were used as the first optical compensation films 5 and 7. Since the second optical compensation plates 6 and 8 have no refractive index anisotropy within the plane, the same effects as in the first to third embodiments may be obtained even when the second optical compensation plates 6 and 8 are formed directly on the first optical compensation plates 5 and 7.

Also the same effects as in the first to third embodiments are obtained if the angles θ1 to θ3, α, and β are set in an allowable range of about plus or minus 5°.

Furthermore, it is preferable in the first and second embodiments that the retardation value of the first optical compensation plates 5 and 7 is selected to be in a range of 390 nm to 480 nm. When the retardation value is smaller than 380 nm, the optical compensation will be insufficient in light having a relatively short wavelength, so that a black tone assumes a bluish hue. On the other hand, when the retardation value is larger than 480 nm, the optical compensation will be insufficient in light having a relatively long wavelength, so that the display assumes a color thereby failing to provide a colorless display.

Furthermore, in all the above embodiments, it is preferable that the product d·Δn of a thickness d of the liquid crystal layer 11 by the refractive index anisotropy Δn is selected to be in a range of 0.77 μm to 0.90 μm. When the product is smaller than 0.77 μm, a sufficiently bright display can not be provided, and when the product is larger than 0.90 μm, a sufficient contrast ratio can not be provided.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal display device comprising:
   a pair of polarizers,
   a liquid crystal display cell disposed between the pair of polarizers, and interposing a liquid crystal layer of liquid crystal molecules twisted by 180° to 270° between a pair of substrate members,
   a first optical compensation plate disposed between at least one polarizer of the pair of polarizers and the liquid crystal display cell, the first optical compensation plate having a refractive index anisotropy in a plane, and having a refractive index in the thickness direction nearly equal to the refractive index of the minimum value within the plane, and
   a second optical compensation plate disposed between the first optical compensation plate and the one polarizer, the second optical compensation having no refractive index anisotropy in the plane, the second optical compensation plate having a refractive index in the thickness direction greater than the refractive index in the plane, and expressing a positive phase difference depending on an inclination from the normal direction, wherein the retardation value of the second optical compensation plate in the direction inclined by 45° from the normal direction is selected to be in a range of 40 nm to 75 nm.

2. The liquid crystal display device of claim 1, wherein the second optical compensation plate is made of a polymer liquid crystal film immobilized in the vertical orientation.

3. The liquid crystal display device of claim 1, wherein the first optical compensation plate is made of a uniaxially drawn polymer film.

4. The liquid crystal display device of claim 1, wherein the first optical compensation plate is made of a twisted and oriented polymer liquid crystal.

5. The liquid crystal display device of claim 1, wherein the first and second optical compensation plates are disposed respectively between the polarizers and liquid crystal display cell, an angle $\theta 1$ formed by a slow axis of one of the first optical compensation plate and an orientation axis of the liquid crystal molecule at the side of the same compensation plate is selected to be in a range of 95° to 105°, an angle $\theta 2$ formed by a slow axis of the other first optical compensation plate and the orientation axis of the liquid crystal molecule at the side of the same compensation plate is selected to be in a range of 75° to 85°, an angle $\alpha$ formed by an absorption axis of the polarizer at the side of the other first optical compensation plate and the orientation axis of liquid crystal molecule at the side of the same polarizer is selected to be in a range of 45° to 55°, and an angle $\beta$ formed by an absorption axis of the polarizer at the side of the former first optical compensation plate and the orientation axis of liquid crystal molecule at the side of the same polarizer is selected to be in a range of 35° to 45°.

6. The liquid crystal display device of claim 1, wherein the first and second optical compensation plates are disposed between the polarizers and liquid crystal display cell, the angle $\theta 1$ formed by the slow axis of one of the first optical compensation plate and the orientation axis of the liquid crystal molecule at the side of the same compensation plate is selected to be in a range of 95° to 105°, the angle $\theta 2$ formed by the slow axis of the other first optical compensation plate and the orientation axis of the liquid crystal molecule at the side of the same compensation plate is selected to be in a range of 35° to 45°, the angle $\alpha$ formed by the absorption axis of the polarizer at the side of the other first optical compensation plate and the orientation axis of the liquid crystal molecule at the side of the same polarizer is selected to be in a range of 45° to 55°, and the angle $\beta$ formed by the absorption axis of the polarizer at the side of the former first optical compensation plate and the orientation axis of liquid crystal molecule at the side of the same polarizer is selected to be in the range of 45° to 55°.

7. The liquid crystal display device of claim 1, wherein the first and second optical compensation plates are disposed between one of the pair of polarizers and liquid crystal display cell, an angle $\theta 3$ formed by the slow axis of the first optical compensation plate and the orientation axis of liquid crystal molecule at the side of the same compensation plate is selected to be in a range of 85° to 95°, an angle $\alpha$ formed by an absorption axis of a polarizer at the side where the optical compensation plate is not disposed and the orientation axis of liquid crystal molecule at the side of the same polarizer is selected to be in a range of 55° to 65°, and an angle $\beta$ formed by an absorption axis of the polarizer at the side of the first optical compensation plate and an orientation axis of the liquid crystal molecule , at the side of the same polarizer side is selected to be in a range of 25° to 35°.

* * * * *